United States Patent
Wang et al.

(10) Patent No.: US 12,462,475 B2
(45) Date of Patent: Nov. 4, 2025

(54) STEREOSCOPIC MODEL PROCESSING METHOD, APPARATUS, DEVICE AND MEDIUM

(71) Applicant: BEIJING ZITIAO NETWORK TECHNOLOGY CO., LTD., Beijing (CN)

(72) Inventors: Guangwei Wang, Beijing (CN); Bowen Chen, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 18/005,663

(22) PCT Filed: Nov. 4, 2022

(86) PCT No.: PCT/CN2022/129879
§ 371 (c)(1),
(2) Date: Jan. 16, 2023

(87) PCT Pub. No.: WO2024/036763
PCT Pub. Date: Feb. 22, 2024

(65) Prior Publication Data
US 2024/0249467 A1    Jul. 25, 2024

(30) Foreign Application Priority Data
Aug. 17, 2022   (CN) .......................... 202210988523.6

(51) Int. Cl.
*G06T 17/00*     (2006.01)
*G06T 7/10*      (2017.01)
(Continued)

(52) U.S. Cl.
CPC ................ *G06T 17/00* (2013.01); *G06T 7/10* (2017.01); *G06T 7/60* (2013.01); *G06T 7/70* (2017.01);
(Continued)

(58) Field of Classification Search
CPC .. G06T 17/00; G06T 7/10; G06T 7/60; G06T 2207/20084; G06T 7/50; G06T 17/10; G06N 20/00
See application file for complete search history.

(56) References Cited

U.S. PATENT DOCUMENTS

2018/0082692 A1* 3/2018 Khoury .................... G10L 17/20
2019/0279368 A1* 9/2019 Feng ....................... G06T 7/143
(Continued)

FOREIGN PATENT DOCUMENTS

| CN | 105006016 A | 10/2015 |
|----|-------------|---------|
| CN | 111369690 A | 7/2020  |

(Continued)

OTHER PUBLICATIONS

Sun Xiaokai, "Object Localization and Recognition Based on RGB-D Information," China Academic Journal Electronic Magazine, Sep. 15, 2014, with English translation (38 pages).
(Continued)

*Primary Examiner* — Saptarshi Mazumder (57) ABSTRACT

The present disclosure relates to a stereoscopic model processing method, apparatus, device and medium. The method includes: acquiring a first stereoscopic model; segmenting the first stereoscopic model based on a plurality of types of preset three-dimensional geometric units, obtaining a type of a three-dimensional geometric unit to which a point of the first stereoscopic model belongs, and obtaining each target component corresponding to the first stereoscopic model; determining a target three-dimensional geometric unit cor-
(Continued)

responding to the each target component according to point information of the each target component, wherein the point information of the each target component includes spatial coordinates of a point of the each target component and a type of a three-dimensional geometric unit to which the point of the each target component belongs; and determining a second stereoscopic model based on the target three-dimensional geometric unit corresponding to the each target component.

11 Claims, 2 Drawing Sheets

(51) Int. Cl.
*G06T 7/60* (2017.01)
*G06T 7/70* (2017.01)

(52) U.S. Cl.
CPC .............. *G06T 2207/20081* (2013.01); *G06T 2207/20084* (2013.01)

(56) References Cited

U.S. PATENT DOCUMENTS

| | | | |
|---|---|---|---|
| 2020/0093464 A1* | 3/2020 | Martins | A61B 8/12 |
| 2021/0027532 A1* | 1/2021 | Lin | G06T 17/05 |
| 2021/0097407 A1 | 4/2021 | Pan et al. | |
| 2022/0101602 A1* | 3/2022 | Serrat | G06F 18/214 |

FOREIGN PATENT DOCUMENTS

| | | |
|---|---|---|
| CN | 112287939 A | 1/2021 |
| CN | 112529015 A | 3/2021 |
| WO | 2019171628 A1 | 9/2019 |

OTHER PUBLICATIONS

Written Opinion of International Searching Authority issued Apr. 20, 2023 in International Application No. PCT/CN2022/129879, with English translation (5 pages).
Extended EP Search Report dated Apr. 24, 2024 in EP Appl. No. 22835548.3 (11 pages).
Jiang, M., et al. "PointSIFT: A SIFT-like Network Module for 3D Point Cloud Semantic Segmentation," ARXIV.org, Cornell University Library, Jul. 2, 2018 (10 pages).
Partial Supplementary European Search Report for European Application No. 22835548.3, mailed Nov. 18, 2024, 11 pages.

* cited by examiner

STEREOSCOPIC MODEL PROCESSING METHOD, APPARATUS, DEVICE AND MEDIUM

CROSS-REFERENCE TO RELATED APPLICATIONS

The present application is a U.S. National Stage Application under 35 U.S.C. § 371 of International Patent Application No. PCT/CN2022/129879, filed on Nov. 4, 2022, which claims priority to China Patent Application No. 202210988523.6 filed on Aug. 17, 2022, the disclosure of both of which are incorporated by reference herein in entirety.

TECHNICAL FIELD

The present disclosure relates to a stereoscopic model processing method, apparatus, device and medium.

BACKGROUND

In some 3D virtual scenes, a three-dimensional stereoscopic model (also known as a 3D model or a stereoscopic model) is usually involved. Generally, a three-dimensional stereoscopic model needs a large amount of parameters.

SUMMARY

An embodiment of the present disclosure provides a stereoscopic model processing method, comprising: acquiring a first stereoscopic model; segmenting the first stereoscopic model based on a plurality of types of preset three-dimensional geometric units, obtaining a type of a three-dimensional geometric unit to which a point of the first stereoscopic model belongs, and obtaining each target component of one or more target components corresponding to the first stereoscopic model, wherein different types of three-dimensional geometric units have different geometric shapes and/or geometric spatial orientations; determining a target three-dimensional geometric unit corresponding to the each target component according to point information of the each target component, wherein the point information of the each target component comprises spatial coordinates of a point of the each target component and a type of a three-dimensional geometric unit to which the point of the each target component belongs; and determining a second stereoscopic model based on the target three-dimensional geometric unit corresponding to the each target component.

In some embodiments, the segmenting of the first stereoscopic model based on the plurality of types of preset three-dimensional geometric units comprises: segmenting the first stereoscopic model by a first machine learning model trained in advance based on the plurality of types of preset three-dimensional geometric units.

In some embodiments, the obtaining of the each target component corresponding to the first stereoscopic model comprises: obtaining a three-dimensional mask confidence level corresponding to each candidate component of the first stereoscopic model output by the first machine learning model; and determining the each target component corresponding to the first stereoscopic model according to the three-dimensional mask confidence level.

In some embodiments, a training method of the first machine learning model comprises: obtaining a sample model, the sample model being labeled with a type of a three-dimensional geometric unit to which a point of the sample model belongs and component information of the sample model; and training an initial first machine learning model based on the sample model until the first machine learning model with completed training is obtained.

In some embodiments, the determining of the target three-dimensional geometric unit corresponding to the each target component according to the point information of the each target component comprises: acquiring parameter information of a three-dimensional geometric unit corresponding to the each target component according to the point information of the each target component, wherein the parameter information comprises type information, size information and spatial location information; and determining the target three-dimensional geometric unit corresponding to the each target component based on the parameter information of the three-dimensional geometric unit.

In some embodiments, the acquiring of the parameter information of the three-dimensional geometric unit corresponding to the each target component according to the point information of the each target component comprises: inputting the point information of the each target component to a second machine learning model trained in advance to obtain the parameter information of the three-dimensional geometric unit corresponding to the each target component output by the second machine learning model.

In some embodiments, a training method of the second machine learning model comprises: acquiring point information of a component sample, the component sample having a three-dimensional geometric unit matching the component sample; and training an initial second machine learning model based on the component sample until a second machine learning model with completed training is obtained.

In some embodiments, the training of the initial second machine learning model based on the component sample until the second machine learning model with completed training is obtained comprises: inputting the component sample into the initial second machine learning model to obtain predicted parameter information of the three-dimensional geometric unit corresponding to the component sample output by the initial second machine learning model; calculating a reconstruction loss function value according to the predicted parameter information and a preset reconstruction loss function; and adjusting a network parameter of the initial second machine learning model according to the reconstruction loss function value, and stopping training until a preset condition is met, to obtain the second machine learning model with completed training.

In some embodiments, the calculating of the reconstruction loss function value according to the predicted parameter information and the preset reconstruction loss function comprises: determining a predicted three-dimensional geometric unit corresponding to the component sample according to the predicted parameter information; acquiring a minimum distance from a target point in the component sample to the predicted three-dimensional geometric unit, wherein the target point is an arbitrary point or a designated point in the component sample; and obtaining the reconstruction loss function value according to the minimum distance corresponding to the target point and the preset reconstruction loss function.

In some embodiments, the second machine learning model comprises a Multi-layer Perceptron (MLP) neural network.

In some embodiments, the geometric shapes comprise at least one of a column, a cone, a platform, a sphere, or a hemisphere.

An embodiment of the present disclosure provides a stereoscopic model processing device, comprising: a model acquisition module configured to acquire a first stereoscopic model; a model segmentation module configured to segment the first stereoscopic model based on a plurality of types of preset three-dimensional geometric units, obtain a type of a three-dimensional geometric unit to which a point of the first stereoscopic model belongs, and obtain each target component of one or more target components corresponding to the first stereoscopic model, wherein different types of three-dimensional geometric units have different geometric shapes and/or geometric spatial orientations; a geometric unit determination module configured to determine a target three-dimensional geometric unit corresponding to the each target component according to point information of the each target component, wherein the point information of the each target component comprises spatial coordinates of a point of the each target component and a type of a three-dimensional geometric unit to which the point of the each target component belongs; and a model determination module configured to determine a second stereoscopic model based on the target three-dimensional geometric unit corresponding to the each target component.

An embodiment of the present disclosure provides an electronic device, comprising: a processor; and a memory configured to store executable instructions of the processor; wherein the processor is configured to read the executable instructions from the memory and execute the instructions to implement the stereoscopic model processing method of any embodiment described above.

An embodiment of the present disclosure provides a computer readable storage medium storing thereon a computer program that, when executed by a processor, causes the processor to implement the stereoscopic model processing method of any embodiment described above.

An embodiment of the present disclosure provides a computer program, comprising: instructions that, when executed by a processor, cause the processor to implement the stereoscopic model processing method of any embodiment described above.

An embodiment of the present disclosure provides a computer program product comprising instructions that, when executed by a processor, cause the processor to implement the stereoscopic model processing method of any embodiment described above.

It should be understood that the contents described in this section are not intended to identify critical or important features of the embodiments of the present disclosure, nor are they intended to be used to limit the scope of the present disclosure. Other features of the present disclosure will be readily understood through the following description.

BRIEF DESCRIPTION OF THE DRAWINGS

Herein, the accompanying drawings, which are incorporated in and constitute a part of this specification, illustrate embodiments of the present disclosure and, together with the description, serve to explain the principles of the present disclosure.

In order to more clearly explain the embodiments of the present disclosure or the technical solutions in the prior art, a brief introduction will be given below for the drawings required to be used in the description of the embodiments or the prior art. It is obvious that, for a person skilled in the art, he or she may also acquire other drawings according to such drawings on the premise that no inventive effort is involved.

DETAILED DESCRIPTION

In order to better understand the above objects, features and advantages of the present disclosure, the solution of the present disclosure will be further described below. It should be noted that, in the case of no conflict, the embodiments and the features of the embodiments of the present disclosure may be combined with each other.

Many specific details are set forth in the following description to facilitate a full understanding of the present disclosure, but the present disclosure can also be implemented in other ways different from those described herein. Obviously, embodiments described in the description are only some embodiments of the present disclosure, and are not all of embodiments thereof.

The inventors of the present disclosure have found that, in the related art, in some three-dimensional virtual scenes, a three-dimensional stereoscopic model (also known as a 3D model or a stereoscopic model) is usually involved, which generally need a large amount of parameters. Taking a three-dimensional stereoscopic model constructed with patches as an example, in general, it is necessary to splice many surface patches (two-dimensional pictures) of specified shapes, such as triangles or quadrangles to form a three-dimensional stereoscopic model. The more realistic the geometric shape of the three-dimensional stereoscopic model is, the more surface patches are required. Each surface patch has a corresponding parameter, so the three-dimensional stereoscopic model have a large number of parameters, leading to high rendering cost and storage cost for the model.

In view of this, the present disclosure provides a stereoscopic model processing method, apparatus, device, and medium.

For example, an embodiment of the present disclosure can convert an existing model such as a surface patch model or a point cloud model into a model composed of three-dimensional geometric units. The three-dimensional geometric units can be various stereoscopic shapes, such as cylinders, spheres, cubes and the like, which is not specifically limited herein. In practical application, the three-dimensional geometric unit can be understood as a building block, so a model based on three-dimensional geometric units can also be called building-block model. For example, each building block can be regarded as a three-dimensional geometric unit. Compared with the need for a large amount of triangular surface patches or quadrilateral surface patches to construct a three-dimensional stereoscopic model (surface patch model), the amount of parameters required for the three-dimensional stereoscopic model obtained by assembling three-dimensional geometric units is far less than the amount of parameters required for the surface patch model.

In view of this, embodiments of the present disclosure provide a stereoscopic model processing method, apparatus, device, and medium, which will be discussed in detail below.

Figure 1:
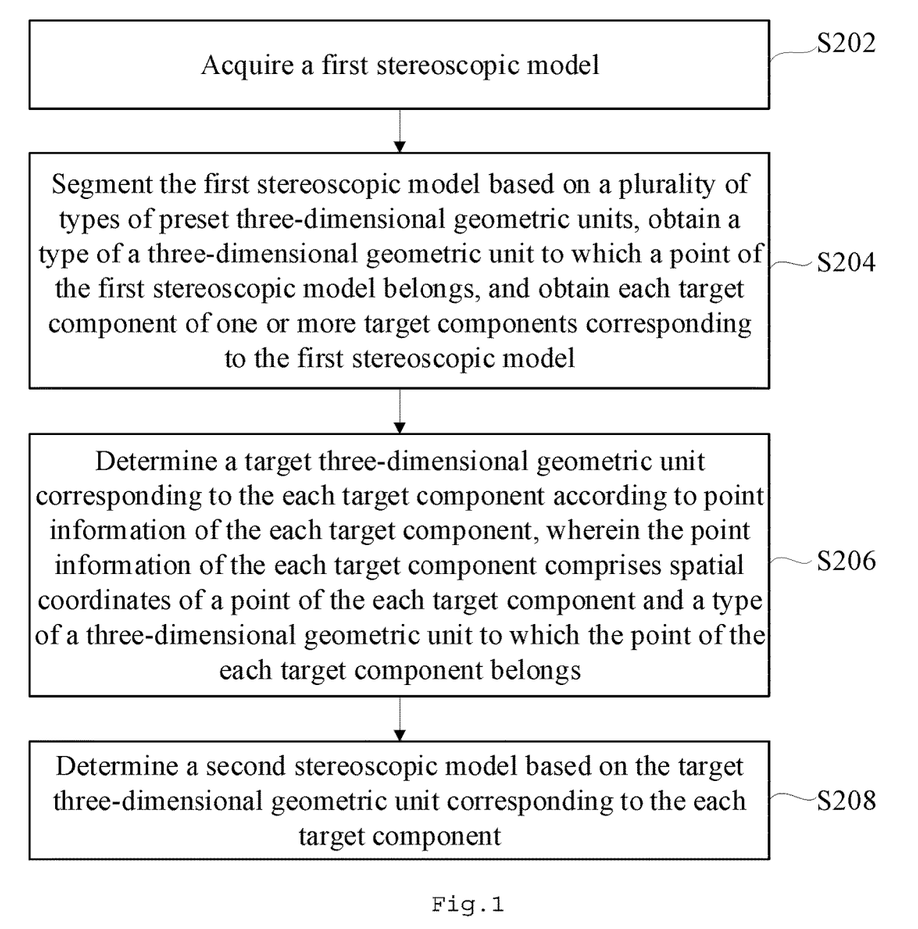
FIG. 1 is a schematic flowchart of a stereoscopic model processing method provided in an embodiment of the present disclosure.

FIG. 1 is a schematic flowchart of a stereoscopic model processing method provided in an embodiment of the present disclosure. The method can be executed by a stereoscopic model processing device, wherein the device can be implemented by software and/or hardware, and can generally be integrated in an electronic device. As shown in FIG. 1, the method mainly comprises the following steps S202 to S208.

In step S202, a first stereoscopic model is acquired.

The first stereoscopic model is a model to be converted. In some embodiments, the first stereoscopic model may be a surface patch model formed by splicing surface patches (two-dimensional pictures) of specified shapes, such as triangles or quadrangles. In other embodiments, the first stereoscopic model can also be a point cloud model or a model constructed in other forms, which is not specifically limited herein.

In step S204, the first stereoscopic model is segmented based on a plurality of types of preset three-dimensional geometric units, a type of a three-dimensional geometric unit to which a point of the first stereoscopic model belongs is obtained, and each target component of one or more target components corresponding to the first stereoscopic model is obtained.

Different types (categories) of three-dimensional geometric units have different geometric shapes and/or geometric spatial orientations. The geometric shape comprise at least one of a column, a cone, a platform, a sphere, or a hemisphere, which is not specifically limited herein. For example, the geometric shape can also comprise a heteromorphic shape or another custom shape. In practical application, each geometric shape can be divided into multiple subtypes. For example, a column can be divided into a cylinder and a prism; the prism can be further divided into a triangular-prism, a quadrangular-prism, a pentagonal-prism, etc.; a cone can be divided into a circular-cone, a pyramid, and the pyramid can be further divided into a triangular pyramid, a rectangular pyramid, etc. Different subtypes (such as the triangular pyramid and the rectangular pyramid) belonging to the same type can also be considered as different geometric shapes. The shape types of three-dimensional geometric units can be flexibly divided according to requirements. The above are only examples and should not be considered as a limitation.

The geometric spatial orientation can be determined based on the directions of XYZ axes in the spatial coordinate system, wherein X, Y, Z axes are perpendicular to each other. For example, if cylinder A is parallel to the X axis, cylinder B is parallel to the Y axis, and cylinder C is parallel to the Z axis, cylinder A, cylinder B, and cylinder C can be considered as three-dimensional geometric units of different types. The above are only examples and should not be considered as a limitation. For example, no matter what the spatial orientations of cylinder A, cylinder B and cylinder C are, because all these geometric shapes are cylinders, they can be considered as three-dimensional geometric units of the same type. In practical application, three-dimensional geometric units of different types can be flexibly provided according to a requirement.

In the embodiment of the present disclosure, it is not necessary to know the structure type of the first stereoscopic model in advance. For example, it is not necessary to know whether the first stereoscopic model is a chair or a table, and the first stereoscopic model can be directly segmented based on existing three-dimensional geometric units to obtain a type of a three-dimensional geometric unit to which a point (such as each point in the first stereoscopic model) of the first stereoscopic model belongs, as well as each target component corresponding to the first stereoscopic model, wherein each target component can be fitted with a three-dimensional geometric unit, that is, each target component has a matched three-dimensional geometric unit. The above method can facilitate more convenient and reasonable model building by using three-dimensional geometric units directly at a later stage.

In practical application, points of a stereoscopic model can be determined according to the type of the stereoscopic model. For example, if the first stereoscopic model is a surface patch model, points of the surface patch model can comprise a plurality of points on the surface of the surface patch model, and can also comprise a plurality of points inside the surface patch model; points of the patch model can be random points or specified critical points. In addition, some conditions that points of the surface patch model need to met can be also specified. For example, the number of points of the surface patch model is greater than a preset number, and/or a density of points of the surface patch model is greater than a preset density. If the first stereoscopic model is a point cloud model, the point cloud model is usually composed of point clouds, and the points can be directly selected from the point clouds. In practical application, when acquiring types of three-dimensional geometric units to which points of a point cloud model belong, a type of a three-dimensional geometric unit to which each point of the point cloud model belongs can be acquired, or types of three-dimensional geometric units to which some points of the point cloud model belong can be acquired, which is not specifically limited herein.

In step S206, a target three-dimensional geometric unit corresponding to the each target component is determined according to point information of the each target component, wherein the point information of the each target component comprises spatial coordinates of a point of the each target component and a type of a three-dimensional geometric unit to which the point of the each target component belongs. Exemplarily, the point information of a target component comprises spatial coordinates of each point of the target component and a type of a three-dimensional geometric unit to which each point of the target component belongs.

In some embodiments, in a case where the spatial coordinates of each point of the target component and a type of a three-dimensional geometric unit to which each point belongs are known, specific parameter information of the three-dimensional geometric unit (i.e., a target three-dimensional geometric unit) that can be used to fit the target component can be further obtained. For example, in a case where the type of the three-dimensional geometric unit is known, size parameters, spatial position or other information of the three-dimensional geometric unit can be further obtained, so as to obtain an exact target three-dimensional geometric unit. In practical application, if the type of a three-dimensional geometric unit is independent of its spatial orientation, in the case that the type of the three-dimensional geometric unit is known, in addition to the size parameters and spatial position of the three-dimensional geometric unit, a spatial orientation or other information can also be obtained. In practical application, the number of target three-dimensional geometric units corresponding to a target component can be one or more, which is not specifically limited herein.

In step S208, a second stereoscopic model is determined based on the target three-dimensional geometric unit corresponding to the each target component.

In some specific embodiments, the target three-dimensional geometric unit corresponding to each target component can be assembled to obtain a second stereoscopic model. In other words, the second stereoscopic model is composed of the above target components. It can be understood that in a case where the exact target three-dimensional geometric unit corresponding to each target component are known, the second stereoscopic model can be obtained by assembling the target three-dimensional geometric units in a way similar to building blocks.

In the above technical solution provided in an embodiment of the present disclosure, through segmenting a first stereoscopic model based on a plurality of types of preset three-dimensional geometric units, a type of a three-dimensional geometric unit to which a point of the first stereoscopic model belongs, as well as each target component corresponding to the first stereoscopic model, are obtained; then, according to point information of each target component, a target three-dimensional geometric unit corresponding to the each target component is determined; and at last, a second stereoscopic model is determined based on the target three-dimensional geometric unit corresponding to the each target component. Since the second stereoscopic model is assembled based on the target three-dimensional geometric units (corresponding to the target components), the number of three-dimensional geometric units required for the model is usually far less than the number of surface patches required. Thus, a smaller number of parameters are required for the model. Therefore, the above method can effectively reduce the number of the parameters of the model, thereby reducing the rendering cost and storage cost required for the model.

In some embodiments of above step S204, the first stereoscopic model is segmented by a first machine learning model trained in advance based on the plurality of types of preset three-dimensional geometric units. A training method of the first machine learning model comprises: obtaining a sample model, the sample model being labeled with a type of a three-dimensional geometric unit to which a point of the sample model (such as each point or a specified point of the sample model) belongs and component information of the sample model; and training an initial first machine learning model based on the sample model until a first machine learning model with completed training is obtained.

The specific structure of the first machine learning model is not limited in the embodiment of the present disclosure. By way of example, the first machine learning model can be implemented using a neural network model, for example, the first machine learning model comprises a first neural network model. The first neural network model can be implemented as an instance segmentation model, that is, a network structure of the instance segmentation model can be referred to for a network structure of the first neural network model. In some specific implementation examples, the first machine learning model can adopt a structure of the PointNet++ neural network. The PointNet++ neural network is a hierarchical neural network, which can use context scale growth to learn local features and adaptively combine multi-scale features. Therefore, it has strong segmentation ability, and can obtain more accurate and reliable segmentation results.

It should be noted that the training method for the first machine learning model and the effect that can be achieved by the first machine learning model in the embodiments of the present disclosure are different from the training method for the instance segmentation model and the effect that can be achieved by the instance segmentation model in the related art. Specifically, in the related art, most of the training samples of the instance segmentation model are labeled with a semantic type (such as chair back, chair leg or the like) of each point of the sample model, and the output of the trained instance segmentation model is a semantic type to which each point of the model to be segmented belongs. Taking a first stereoscopic model which is a chair as an example, that is, the instance segmentation model in the related art will output, for each point of the first stereoscopic model, whether the point belongs to a chair back or a chair leg. In the embodiments of the present disclosure, it is not necessary to identify the semantic type of each point of the model, but to identify the type of a three-dimensional geometric unit each point of the model belongs to. Through labeling a sample model with a type of a three-dimensional geometric unit to which a point of the sample model belong and the component information of the sample model, and training an initial first machine learning model using the sample model, a first machine learning model trained in advance can be obtained. The trained first machine learning model can be used to achieve quick and effective segmentation of the first stereoscopic model, obtain a type of a three-dimensional geometric units to which each point of the first stereoscopic model belongs, and obtain each target component of the first stereoscopic model.

Based on a plurality of types of preset three-dimensional geometric units, the first stereoscopic model is segmented using the first machine learning model trained in advance, so as to obtain a type of a three-dimensional geometric unit to which each point of the first stereoscopic model belongs, as well as a plurality of candidate components of the first stereoscopic model, wherein the candidate component can be represented in a form of a three-dimensional Mask. In the embodiment of the present disclosure, first of all, a three-dimensional mask confidence level corresponding to each candidate component of the first stereoscopic model output by the first machine learning model is obtained; then, each target component corresponding to the first stereoscopic model is determined according to the three-dimensional mask confidence level. In practical application, an optimal combination can be selected from all candidate components according to the three-dimensional mask confidence level corresponding to the candidate components. Each candidate component comprised in the optimal combination is a target component. The target component has higher three-dimensional mask confidence level, and an overall three-dimensional mask confidence level corresponding to the optimal combination is higher than three-dimensional mask confidence levels corresponding to other combinations. Furthermore, all the components comprised in the optimal combination can form a complete first stereoscopic model.

In the above way, the first stereoscopic model can be reasonably segmented without knowing a structure type of the first stereoscopic model in advance, and a type of a three-dimensional geometric unit to which each point of the first stereoscopic model belongs can be predicted in a more reliable manner. On this basis, an optimal combination of the components of the first stereoscopic model is determined according to the confidence level of a three-dimensional Mask corresponding to each component, which can improve the accuracy of the subsequent determination of the target three-dimensional geometric units, and ensure the structural consistency between the second stereoscopic model finally derived and the first stereoscopic model.

In some embodiments of step S206 above, parameter information of a three-dimensional geometric unit corresponding to the each target component is acquired according to point information of the each target component, wherein the parameter information comprises type information, size information and spatial location information; and a target three-dimensional geometric unit corresponding to the each target component is determined based on the parameter information of the three-dimensional geometric unit. For example, on the basis that the spatial coordinates of each point of a target component and the type of a three-dimensional geometric unit to which the each point belongs are known, parameter information of a three-dimensional geometric unit corresponding to the target component can be further analyzed and obtained. The parameter information comprises type information, size information and spatial location information, but should not be regarded as a limitation. For example, in a case where the type of the three-dimensional geometric unit is related to the spatial orientation, in practical application, the parameter information can further comprise spatial orientation information.

In some specific embodiments, the point information of the each target component is input to a second machine learning model trained in advance to obtain the parameter information of the three-dimensional geometric unit corresponding to the each target component output by the second machine learning model. For example, a training method of the second machine learning model comprises: acquiring point information of a component sample, the component sample having a three-dimensional geometric unit matching the component sample; and training an initial second machine learning model based on the component sample until a second machine learning model with completed training is obtained. By way of example, the component sample used to train the second machine learning model may be a component of the sample model described above (which is used to train the first machine learning model), and the three-dimensional geometric unit matching the component sample may be a three-dimensional geometric unit corresponding to the component in the above sample model. In the above way, parameter information of a three-dimensional geometric unit corresponding to each target component can be efficiently and reliably obtained by using the processing ability of the machine learning model directly.

A structure of the second machine learning model is not specifically limited in the embodiments of the present disclosure. In some specific embodiments, the second machine learning model is implemented by a neural network. For example, the second machine learning model comprises a second neural network model. The second neural network model can comprise a MLP (Multi-layer Perceptron) network. A architecture of the MLP network is simple and easy to implement, and has good processing speed and accuracy, so it can be used to quickly and accurately generate parameter information of a three-dimensional geometric unit corresponding to each target component.

To facilitate understanding, an example will be given below to illustrate the training of an initial second machine learning model based on component samples until a second machine learning model with completed training is obtained, which comprises step a to step c.

In step a, the component sample is input into the initial second machine learning model to obtain predicted parameter information of the three-dimensional geometric unit corresponding to the component sample output by the initial second machine learning model. The predicted parameter information comprises type information, size information and spatial location information of the three-dimensional geometric unit predicted by the second machine learning model.

In step b, a reconstruction loss function value is calculated according to the predicted parameter information and a preset reconstruction loss function. In some specific embodiments, the step can be implemented by referring to the following step b1 to step b3.

In step b1, a predicted three-dimensional geometric unit corresponding to the component sample is determined according to the predicted parameter information. It can be understood that an exact predicted three-dimensional geometric unit can be obtained according to the type information, size information and spatial location information of the three-dimensional geometric unit predicted by the second machine learning model.

In step b2, a minimum distance from a target point in the component sample to the predicted three-dimensional geometric unit is acquired, wherein the target point is an arbitrary point or a designated point in the component sample. There may be a plurality of target points, for example, all points in the component sample can be treated as target points, or some specified critical points in the component sample can be used as target points, which is not specifically limited herein.

In step b3, the reconstruction loss function value is obtained according to the minimum distance corresponding to the target point and the preset reconstruction loss function.

In some embodiments, the reconstruction loss function value is calculated according to a minimum distance corresponding to each target point, and then the reconstruction loss function values corresponding to all target points are weighted to obtain a final reconstruction loss function value.

In step c, a network parameter of the initial second machine learning model is adjusted according to the reconstruction loss function value, and training is stopped until a preset condition is met, to obtain the second machine learning model with completed training.

The preset condition comprises one or more of the following: a the reconstructed loss function value converging to a preset loss threshold, a training duration reaching a preset duration threshold, or a training number reaching a preset number threshold. The second machine learning model with completed training usually has good parameter prediction ability, and the predicted three-dimensional geometric unit can be as close as possible to the component, and can reliably fit the component.

Figure 2:
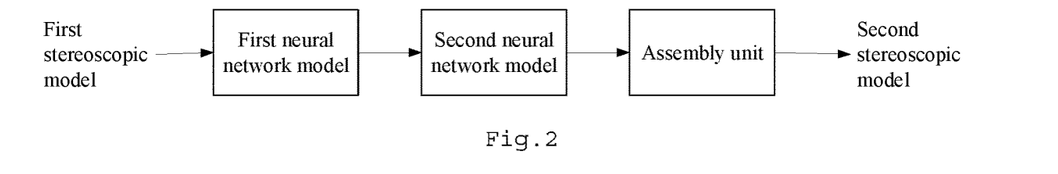
FIG. 2 is a schematic diagram of stereoscopic model processing provided in an embodiment of the present disclosure.

Based on the above, an embodiment of the present disclosure provides a specific implementation of a model processing method. Referring to FIG. 2, a schematic diagram of stereoscopic model processing is shown. FIG. 2 shows an example, in which the machine learning model is a neural network model. A first stereoscopic model is input to the first neural network model, and as an output result of the first neural network model, a type of a three-dimensional geometric unit to which each point in the first stereoscopic model belongs, as well as each target component of the first stereoscopic model, can be obtained. Then, a process is performed using a second neural network model based on point information of each target component, and parameter information of a target three-dimensional geometric unit corresponding to each target component is output. In a case where the size, spatial location and other information of the target three-dimensional geometric unit are known, the target three-dimensional geometric unit corresponding to each target component is assembled (also known as assembly or combination) by an assembly unit to obtain a second stereoscopic model.

Figure 3:
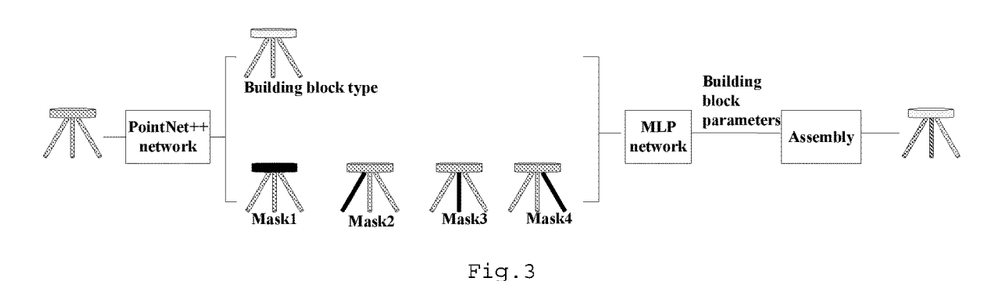
FIG. 3 is a schematic diagram of stereoscopic model processing provided in an embodiment of the present disclosure.

In some specific embodiments, the first neural network model comprises a PointNet++ network. The second neural network model comprises a MLP network. On this basis, a schematic diagram of stereoscopic model processing is further shown in FIG. 3. In FIG. 3, as an example, the first stereoscopic model is a stool. Spatial position coordinates (3D coordinates) of each point of the stool are input into the PointNet++ network to segment the stool by the PointNet++ network and obtain a type of three-dimensional geometric unit (referred to as a building block) to which the each point of the stool belongs. As can be seen from FIG. 3, after segmentation of the stool based on building block shapes through PointNet++, the segmentation result indicates that color of the stool seat is different from color of the stool leg. Specifically, the points on the stool seat and the points on the stool leg belong to different types of building blocks. For example, the type of the building block to which the points on the stool seat belong is cylinder, and the type of the building block to which the points on the stool leg belong is prism. Different stool legs belong to the same building block type, so different stool legs have the same color.

The segmentation result in FIG. 3 also comprises a series of Masks. Different Masks correspond to different components. Different stool legs correspond to different Masks, even though the different stool legs belong to the same building block type. Therefore, components of the stool can be completely segmented by Masks. It should be noted that the segmentation result usually contains a large amount of Masks, and each Mask has a corresponding confidence level, indicating the degree of credibility that the Mask corresponds to a stool component. In practical application, a group of Masks with the highest confidence level can be selected from multiple Masks to construct a complete stool. FIG. 3 shows a group of selected target Masks, each of which corresponding to a component, i.e., a target component described above. Next, point information of a target component can be input to a MLP network, and a building block parameter (a parameter of a three-dimensional geometric unit used to fit the target component) of each target component can be output through the MLP network. That is, a building block (the above target three-dimensional geometric unit) that can be used to fit the target component can be found. Finally, a stool assembled by various building blocks can be obtained. It should be noted that PointNet++ in FIG. 3 segments the stool based on the shapes of building blocks, rather than based on the stool seat and the stool legs. That is, it does not judge whether each point on the stool belongs to a stool seat or a stoolr leg. Instead, it judges the building block type to which each point on the stool belongs, such as cylinder, cuboid, etc. Each building block type can fit a stool component. For example, a cylinder can be used to fit the stool seat, and a prism can be used to fit a stool leg. FIG. 3 is only an example, and should not be regarded as a limitation. For the specific implementation principle, reference can be made to the related content described above, which will not be repeated here.

It can be understood that the stool input to the PointNet++ network is composed of point clouds or surface patches, and thereby having a large amount of model parameters. The stool finally obtained by the above method as shown in FIG. 3 is composed of several cylindrical building blocks, which greatly reduces the number of the model parameters.

To sum up, the above stereoscopic model processing method provided by the embodiment of the present disclosure can convert a model with more parameters such as a surface patch model or a point cloud model into a model (building block model) based on three-dimensional geometric units with fewer parameters, so that model rendering cost and storage cost can be reduced, which is conducive to real-time rendering or on-end rendering.

In addition, the above method provided by the embodiment of the present disclosure does not need to know the type (structure type) of the model to be processed in advance, and does not need to perform semantic segmentation of the model to be processed in advance. Instead, the first stereoscopic model is directly segmented based on existing three-dimensional geometric units, bringing an advantage that each component has a type of a three-dimensional geometric unit matching the each component, and effective fitting of corresponding components can be achieved directly using three-dimensional geometric units of corresponding types. However, if the semantic method is used for segmentation, the type of the model to be processed need be known in advance, and the effect of fitting the semantic segmentation parts using three-dimensional geometric units in the later stage may be poor, since it is not easy to find fully matched three-dimensional geometric units. In addition, the above method provided by the embodiment of the present disclosure does not need to know the total number of three-dimensional geometric units required to convert the first stereoscopic model to the second stereoscopic model. Compared with the method of obtaining the total number of three-dimensional geometric units in advance and then directly fitting, the above method of segmentation before fitting provided by the embodiment of the present disclosure is more accurate and reliable, suitable for a wide range of applications, particularly suitable for models such as building block models that can be directly combined and represented using three-dimensional geometric units.

Figure 4:
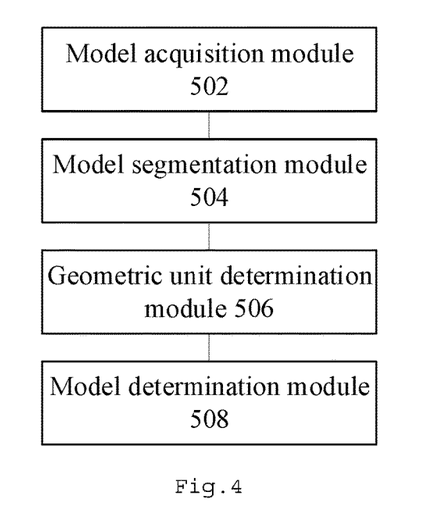
FIG. 4 is a schematic structure diagram of a stereoscopic model processing device provided in an embodiment of the present disclosure.

Corresponding to the above model processing method, FIG. 4 is a schematic structure diagram of a stereoscopic model processing device provided in an embodiment of the present disclosure. The device can be realized by software and/or hardware, and can be generally integrated in an electronic device. As shown in FIG. 4, the device comprises: a model acquisition module 502, a model segmentation module 504, a geometric unit determination module 506, and a model determination module 508.

The model acquisition module 502 is configured to acquire a first stereoscopic model.

The model segmentation module 504 is configured to segment the first stereoscopic model based on a plurality of types of preset three-dimensional geometric units, obtain a type of a three-dimensional geometric unit to which a point of the first stereoscopic model belongs, and obtain each target component of one or more target components corresponding to the first stereoscopic model, wherein different types of three-dimensional geometric units have different geometric shapes and/or geometric spatial orientations.

The geometric unit determination module 506 is configured to determine a target three-dimensional geometric unit corresponding to the each target component according to point information of the each target component, wherein the point information of the each target component comprises spatial coordinates of a point of the each target component and a type of a three-dimensional geometric unit to which the point of the each target component belongs.

The model determination module 508 is configured to determine a second stereoscopic model based on the target three-dimensional geometric unit corresponding to the each target component.

Since the second stereoscopic model is obtained based on the target three-dimensional geometric units (corresponding to the target components), the number of three-dimensional geometric units required for the model is usually far less than the number of surface patches required. Thus, a smaller number of parameters are required for the model. Therefore, the above method can effectively reduce the number of model parameters, thereby reducing the rendering cost and storage cost required for the model.

In some embodiments, the model segmentation module 504 is specifically configured to segment the first stereoscopic model by a first machine learning model trained in advance based on the plurality of types of preset three-dimensional geometric units.

In some embodiments, the device further comprises a first training module configured to train the first machine learning model by: obtaining a sample model, the sample model being labeled with a type of a three-dimensional geometric unit to which a point of the sample model belongs and component information of the sample model, and training an initial first machine learning model based on the sample model until a first machine learning model with completed training is obtained.

In some embodiments, the model segmentation module 504 is specifically configured to: obtain a three-dimensional mask confidence level corresponding to each candidate component of the first stereoscopic model output by the first machine learning model, and determine the each target component corresponding to the first stereoscopic model according to the three-dimensional mask confidence level.

In some embodiments, the first machine learning model comprises a PointNet++ neural network.

In some embodiments, the geometric unit determination module 506 is specifically configured to: acquire parameter information of a three-dimensional geometric unit corresponding to the each target component according to the point information of the each target component, wherein the parameter information comprises type information, size information and spatial location information, and determine the target three-dimensional geometric unit corresponding to the each target component based on the parameter information of the three-dimensional geometric unit.

In some embodiments, the geometric unit determination module 506 is specifically configured to input the point information of the each target component to a second machine learning model trained in advance to obtain the parameter information of the three-dimensional geometric unit corresponding to the each target component output by the second machine learning model.

In some embodiments, the device further comprises a second training module configured to train the second machine learning model by: acquiring point information of a component sample, the component sample having a three-dimensional geometric unit matching the component sample, and training an initial second machine learning model based on the component sample until a second machine learning model with completed training is obtained.

In some embodiments, the second training module is specifically configured to: input the component sample into the initial second machine learning model to obtain predicted parameter information of the three-dimensional geometric unit corresponding to the component sample output by the initial second machine learning model, calculate a reconstruction loss function value according to the predicted parameter information and a preset reconstruction loss function, and adjust a network parameter of the initial second machine learning model according to the reconstruction loss function value, and stop training until a preset condition is met, to obtain the second machine learning model with completed training.

In some embodiments, the second training module is specifically configured to: determine a predicted three-dimensional geometric unit corresponding to the component sample according to the predicted parameter information, acquire a minimum distance from a target point in the component sample to the predicted three-dimensional geometric unit, wherein the target point is an arbitrary point or a designated point in the component sample, and obtain the reconstruction loss function value according to the minimum distance corresponding to the target point and the preset reconstruction loss function.

In some embodiments, the second machine learning model comprises an MLP neural network.

In some embodiments, the geometric shapes comprise at least one of a column, a cone, a platform, a sphere, or a hemisphere.

The module processing device provided in the embodiments of the present disclosure can execute the module processing method provided in any embodiment of the present disclosure, and has corresponding functional modules to implement the method and achieve the beneficial effect of the present disclosure.

Those skilled in the art can clearly understand that, for the convenience and simplicity of description, for the specific working processes of the device embodiments described above, reference can be made to the corresponding processes in the method embodiment, which will not be repeated here.

An embodiment of the present disclosure provides an electronic device, comprising: a processor; and a memory configured to store executable instructions of the processor; wherein the processor is configured to read the executable instructions from the memory and execute the instructions to implement the stereoscopic model processing method described above.

Figure 5:
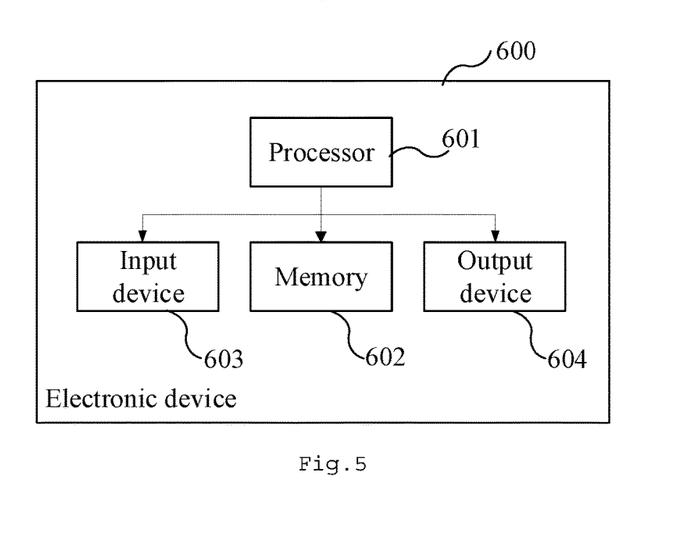
FIG. 5 is a structural diagram of an electronic device provided in an embodiment of the present disclosure.

FIG. 5 is a structural diagram of an electronic device provided in an embodiment of the present disclosure. As shown in FIG. 5, the electronic device 600 comprises one or more processors 601 and a memory 602.

The processor 601 may be a central processing unit (CPU) or a processing unit in other forms having data processing capability and/or instruction execution capability, and may control other components in the electronic device 600 to perform desired functions.

The memory 602 may comprise one or more computer program products, which may comprise various forms of computer-readable storage media, such as volatile memory and/or non-volatile memory. The volatile memory may comprise random access memory (RAM) and/or cache memory or the like. The non-volatile storage medium comprises, for example, read-only memory (ROM), hard disk, flash memory or the like. One or more computer program instructions can be stored on the computer-readable storage medium, and the processor 601 can execute the program instructions to realize the model processing method and/or other desired functions of the embodiments of the present disclosure described above. Various contents such as input signals, signal components, noise components and the like can also be stored in the computer-readable storage medium.

In some embodiments, the electronic device 600 may further comprise: an input device 603 and an output device 604, which are interconnected by a bus system and/or other form of connection mechanism (not shown).

In addition, the input device 603 may also comprise, for example, a keyboard, a mouse, or the like.

The output device 604 can output various information to the outside, comprising determined distance information, orientation information, or the like. The output device 604 may comprise, for example, a display, a speaker, a printer, a communication network, a remote output device connected thereto, and the like.

Of course, to simplify, only some components related to the present disclosure in the electronic device 600 are shown in FIG. 5, and components such as buses, input/output interfaces, and the like are omitted. In addition, depending on the specific application, the electronic device 600 may also comprise any other appropriate components.

In addition to the above methods and devices, an embodiment of the present disclosure can also be a computer program product, which comprises computer program instructions that, when executing by a processor, cause the processor to execute the model processing method provided in the embodiments of the present disclosure.

The computer program product may comprise program code complied by any combination of one or more program design languages for executing operations of some embodiments of the present disclose, the program design languages comprising object-oriented program design languages, such as Java, C++, etc, as well as conventional procedural program design languages, such as "C" program design language or similar program design language. The program code may be completely or partly executed on a user computing device, or executed as an independent software package, partly executed on the user computing device and partly executed on a remote computing device, or completely executed on a remote computing device or server.

In addition, an embodiment of the present disclosure can also be a computer readable storage medium storing thereon a computer program (i.e., computer program instructions) that, when executed by a processor, cause the processor to execute the model processing method provided in the embodiments of the present disclosure. For example, the computer readable storage medium is a non-transitory computer readable storage medium.

The computer readable storage medium can employ any combination of one or more readable media. The readable medium can be a readable signal medium or a readable storage medium. The readable storage medium can be, for example, but not limited to, an electronic, magnetic, optical, electromagnetic, infrared, or semiconductor system, apparatus, or device, or any combination of the above. More specific examples (non-exhaustive lists) of readable storage media comprise: electrical connection with one or more wires, portable disk, hard disk, random access memory (RAM), read only memory (ROM), erasable programmable read only memory (EPROM or flash), fiber optics, portable compact disk Read only memory (CD-ROM), optical storage device, magnetic storage device, or any suitable combination of the foregoing.

An embodiment of the present disclosure further provides a computer program, comprising: instructions that, when executed by a processor, cause the processor to implement the stereoscopic model processing method of the embodiments of the present disclosure.

An embodiment of the present disclosure further provides a computer product comprising a computer program/instructions that, when executed by a processor, cause the processor to implement the stereoscopic model processing method of the embodiments of the present disclosure.

Note that, in this description, the use of relational terms such as "first" and "second" and the like are used solely to distinguish one entity or action from another entity or action without necessarily requiring or implying any actual such relationship or order between such entities or actions. Further, terms "comprise", "include" or their any other variations are intended to encompass non-exclusive composition, so that a process, method, product or device comprising a series of factors may comprise not only these factors, but also other factors that are not listed explicitly, or factors intrinsic to the process, method, product or device. Without more limitation, a factor defined by wording "comprise one . . . " does not exclude the existence of other same factors in a process, method, product or device comprising such factor.

The above descriptions are only specific embodiments of the present disclosure, so that those skilled in the art can understand or implement the present disclosure. Various modifications to these embodiments will be apparent to those skilled in the art, and the generic principles defined herein may be implemented in other embodiments without departing from the spirit or scope of the present disclosure. Accordingly, the present disclosure should not be limited to the specific embodiments described herein, but should be accorded the broadest scope consistent with the principles and novel features disclosed herein.

What is claimed is:

1. A stereoscopic model processing method, comprising:
acquiring a first stereoscopic model;
segmenting the first stereoscopic model based on a plurality of types of preset three-dimensional geometric units, obtaining a type of a three-dimensional geometric unit to which each point of the first stereoscopic model belongs and a plurality of candidate components of the first stereoscopic model, wherein each candidate component of the plurality of candidate components is represented in a form of a three-dimensional mask, and according to a three-dimensional mask confidence level corresponding to the each candidate component, selecting and obtaining each target component of one or more target components corresponding to the first stereoscopic model from the plurality of candidate components, wherein different types of three-dimensional geometric units have different geometric shapes and/or geometric spatial orientations;
determining a target three-dimensional geometric unit corresponding to the each target component according to point information of the each target component, wherein the point information of the each target component comprises spatial coordinates of a point of the each target component and a type of a three-dimensional geometric unit to which the point of the each target component belongs; and
determining a second stereoscopic model based on the target three-dimensional geometric unit corresponding to the each target component,
wherein the determining of the target three-dimensional geometric unit corresponding to the each target component according to the point information of the each target component comprises: acquiring parameter information of a three-dimensional geometric unit corresponding to the each target component according to the point information of the each target component, wherein the parameter information comprises type information, size information and spatial location information; and determining the target three-dimensional geometric unit corresponding to the each target component based on the parameter information of the three-dimensional geometric unit;

the acquiring of the parameter information of the three-dimensional geometric unit corresponding to the each target component according to the point information of the each target component comprises: inputting the point information of the each target component to a second machine learning model trained in advance to obtain the parameter information of the three-dimensional geometric unit corresponding to the each target component output by the second machine learning model;

a training method of the second machine learning model comprises: acquiring point information of a component sample, the component sample having a three-dimensional geometric unit matching the component sample; and training an initial second machine learning model based on the component sample until a second machine learning model with completed training is obtained;

the training of the initial second machine learning model based on the component sample until the second machine learning model with completed training is obtained comprises: inputting the component sample into the initial second machine learning model to obtain predicted parameter information of the three-dimensional geometric unit corresponding to the component sample output by the initial second machine learning model; calculating a reconstruction loss function value according to the predicted parameter information and a preset reconstruction loss function; and adjusting a network parameter of the initial second machine learning model according to the reconstruction loss function value, and stopping training until a preset condition is met, to obtain the second machine learning model with completed training; and the calculating of the reconstruction loss function value according to the predicted parameter information and the preset reconstruction loss function comprises: determining a predicted three-dimensional geometric unit corresponding to the component sample according to the predicted parameter information; acquiring a minimum distance from a target point in the component sample to the predicted three-dimensional geometric unit, wherein the target point is an arbitrary point or a designated point in the component sample; and obtaining the reconstruction loss function value according to the minimum distance corresponding to the target point and the preset reconstruction loss function.

2. The stereoscopic model processing method according to claim 1, wherein the segmenting of the first stereoscopic model based on the plurality of types of preset three-dimensional geometric units comprises:
segmenting the first stereoscopic model by a first machine learning model trained in advance based on the plurality of types of preset three-dimensional geometric units.

3. The stereoscopic model processing method according to claim 2, wherein the obtaining of the each target component corresponding to the first stereoscopic model comprises:
obtaining the three-dimensional mask confidence level corresponding to the each candidate component of the first stereoscopic model output by the first machine learning model; and determining the each target component corresponding to the first stereoscopic model according to the three-dimensional mask confidence level.

4. The stereoscopic model processing method according to claim 2, wherein a training method of the first machine learning model comprises:
obtaining a sample model, the sample model being labeled with a type of a three-dimensional geometric unit to which a point of the sample model belongs and component information of the sample model; and
training an initial first machine learning model based on the sample model until the first machine learning model with completed training is obtained.

5. The stereoscopic model processing method according to claim 1, wherein the second machine learning model comprises a Multi-layer Perceptron (MLP) neural network.

6. The stereoscopic model processing method according to claim 1, wherein the geometric shapes comprise at least one of a column, a cone, a platform, a sphere, or a hemisphere.

7. An electronic device, comprising:
a processor; and
a memory configured to store executable instructions of the processor;
wherein the processor is configured to read the executable instructions from the memory and execute the instructions to:
acquire a first stereoscopic model;
segment the first stereoscopic model based on a plurality of types of preset three-dimensional geometric units, obtain a type of a three-dimensional geometric unit to which each point of the first stereoscopic model belongs and a plurality of candidate components of the first stereoscopic model, wherein each candidate component of the plurality of candidate components is represented in a form of a three-dimensional mask, and according to a three-dimensional mask confidence level corresponding to the each candidate component, select and obtain each target component of one or more target components corresponding to the first stereoscopic model from the plurality of candidate components, wherein different types of three-dimensional geometric units have different geometric shapes and/or geometric spatial orientations;
determine a target three-dimensional geometric unit corresponding to the each target component according to point information of the each target component, wherein the point information of the each target component comprises spatial coordinates of a point of the each target component and a type of a three-dimensional geometric unit to which the point of the each target component belongs; and
determine a second stereoscopic model based on the target three-dimensional geometric unit corresponding to the each target component,
wherein the determining of the target three-dimensional geometric unit corresponding to the each target component according to the point information of the each target component comprises: acquiring parameter information of a three-dimensional geometric unit corresponding to the each target component according to the point information of the each target component, wherein the parameter information comprises type information, size information and spatial location information; and determining the target three-dimensional geometric unit corresponding to the each target component based on the parameter information of the three-dimensional geometric unit;

the acquiring of the parameter information of the three-dimensional geometric unit corresponding to the each target component according to the point information of the each target component comprises: inputting the point information of the each target component to a second machine learning model trained in advance to obtain the parameter information of the three-dimensional geometric unit corresponding to the each target component output by the second machine learning model;

a training method of the second machine learning model comprises: acquiring point information of a component sample, the component sample having a three-dimensional geometric unit matching the component sample; and training an initial second machine learning model based on the component sample until a second machine learning model with completed training is obtained;

the training of the initial second machine learning model based on the component sample until the second machine learning model with completed training is obtained comprises: inputting the component sample into the initial second machine learning model to obtain predicted parameter information of the three-dimensional geometric unit corresponding to the component sample output by the initial second machine learning model; calculating a reconstruction loss function value according to the predicted parameter information and a preset reconstruction loss function; and adjusting a network parameter of the initial second machine learning model according to the reconstruction loss function value, and stopping training until a preset condition is met, to obtain the second machine learning model with completed training; and the calculating of the reconstruction loss function value according to the predicted parameter information and the preset reconstruction loss function comprises: determining a predicted three-dimensional geometric unit corresponding to the component sample according to the predicted parameter information; acquiring a minimum distance from a target point in the component sample to the predicted three-dimensional geometric unit, wherein the target point is an arbitrary point or a designated point in the component sample; and obtaining the reconstruction loss function value according to the minimum distance corresponding to the target point and the preset reconstruction loss function.

8. A non-transitory computer readable storage medium storing thereon a computer program that, when executed by a processor, causes the processor to:

acquire a first stereoscopic model;

segment the first stereoscopic model based on a plurality of types of preset three-dimensional geometric units, obtain a type of a three-dimensional geometric unit to which each point of the first stereoscopic model belongs and a plurality of candidate components of the first stereoscopic model, wherein each candidate component of the plurality of candidate components is represented in a form of a three-dimensional mask, and according to a three-dimensional mask confidence level corresponding to the each candidate component, select and obtain each target component of one or more target components corresponding to the first stereoscopic model from the plurality of candidate components, wherein different types of three-dimensional geometric units have different geometric shapes and/or geometric spatial orientations;

determine a target three-dimensional geometric unit corresponding to the each target component according to point information of the each target component, wherein the point information of the each target component comprises spatial coordinates of a point of the each target component and a type of a three-dimensional geometric unit to which the point of the each target component belongs; and determine a second stereoscopic model based on the target three-dimensional geometric unit corresponding to the each target component, wherein the computer program when executed by the processor, causes the processor to: acquire parameter information of a three-dimensional geometric unit corresponding to the each target component according to the point information of the each target component, wherein the parameter information comprises type information, size information and spatial location information; and determine the target three-dimensional geometric unit corresponding to the each target component based on the parameter information of the three-dimensional geometric unit;

the computer program when executed by the processor, causes the processor to: input the point information of the each target component to a second machine learning model trained in advance to obtain the parameter information of the three-dimensional geometric unit corresponding to the each target component output by the second machine learning model;

a training method of the second machine learning model comprises: acquiring point information of a component sample, the component sample having a three-dimensional geometric unit matching the component sample; and training an initial second machine learning model based on the component sample until a second machine learning model with completed training is obtained; and the computer program when executed by the processor, causes the processor to: input the component sample into the initial second machine learning model to obtain predicted parameter information of the three-dimensional geometric unit corresponding to the component sample output by the initial second machine learning model; calculate a reconstruction loss function value according to the predicted parameter information and a preset reconstruction loss function; and adjust a network parameter of the initial second machine learning model according to the reconstruction loss function value, and stop training until a preset condition is met, to obtain the second machine learning model with completed training;

wherein the calculating of the reconstruction loss function value according to the predicted parameter information and the preset reconstruction loss function comprises: determining a predicted three-dimensional geometric unit corresponding to the component sample according to the predicted parameter information; acquiring a minimum distance from a target point in the component sample to the predicted three-dimensional geometric unit, wherein the target point is an arbitrary point or a designated point in the component sample; and obtaining the reconstruction loss function value according to the minimum distance corresponding to the target point and the preset reconstruction loss function.

9. The non-transitory computer readable storage medium according to claim 8, wherein the computer program when executed by the processor, causes the processor to:
- segment the first stereoscopic model by a first machine learning model trained in advance based on the plurality of types of preset three-dimensional geometric units.

10. The non-transitory computer readable storage medium according to claim 9, wherein the computer program when executed by the processor, causes the processor to:
- obtain the three-dimensional mask confidence level corresponding to the each candidate component of the first stereoscopic model output by the first machine learning model; and
- determine the each target component corresponding to the first stereoscopic model according to the three-dimensional mask confidence level.

11. The non-transitory computer readable storage medium according to claim 9, wherein a training method of the first machine learning model comprises:
- obtaining a sample model, the sample model being labeled with a type of a three-dimensional geometric unit to which a point of the sample model belongs and component information of the sample model; and
- training an initial first machine learning model based on the sample model until the first machine learning model with completed training is obtained.

\* \* \* \* \*